United States Patent [19]

Barasch

[11] 3,761,965

[45] Oct. 2, 1973

[54] SEAMLESS PLASTIC ARTICLES HAVING A TEXTURED SURFACE

[75] Inventor: Werner Barasch, Los Gatos, Calif.

[73] Assignee: Becton, Dickinson and Company, East Rutherford, N.J.

[22] Filed: June 19, 1972

[21] Appl. No.: 263,771

[52] U.S. Cl. .................................................. 2/167

[51] Int. Cl. .......................................... A41d 19/00

[58] Field of Search ...................... 2/159, 161, 167, 2/168, 20, 16

[56] References Cited

UNITED STATES PATENTS

| | | | |
|---|---|---|---|
| 3,148,235 | 9/1964 | Velonis et al. | 2/167 X |
| 3,197,786 | 8/1965 | Velonis et al. | 2/167 |
| 3,255,492 | 6/1966 | Velonis et al. | 2/168 X |
| 3,235,881 | 2/1966 | Chisholm | 2/167 |
| 3,072,914 | 1/1963 | Velonis et al. | 2/167 |

*Primary Examiner*—Geo. V. Larkin
*Attorney*—David S. Kane et al.

[57] ABSTRACT

Impermeable relatively thin resin film having a granular textured surface which is adapted to be made into articles such as surgeons' gloves is disclosed. The films are made from liquid dispersions of vinyl chloride polymers in a suitable plasticizer. The liquid dispersion or plastisol is applied to a suitable form to provide film of the resin dispersion thereon. The resin film is heat set and has applied thereto in a non-uniform distribution particles of a granular vinyl chloride polymer which becomes embedded therein, then the film is heat cured thereby forming a film having a granular textured surface.

6 Claims, 3 Drawing Figures

2
14
13
12
10
15
11
24
2
20
17
18

2
2
14
13
12
10
15
11
24
20
17
18

13
24
24
24
20
24

20

24
30

SEAMLESS PLASTIC ARTICLES HAVING A TEXTURED SURFACE

BACKGROUND OF THE INVENTION

It is known for example to prepare a disposable sanitary glove in which the glove is formed of a film having a textured surface. See U. S. Pat. No. 3,072,914. However, this patented teaching employs the step of incorporating all of the raw materials in the liquid plastisol in which the texturizing particles of granular material, is also included. It has been found that minute pinholes and a weakening of the film occurs. Obviously, if pinholes are present, the material is not suitable for use as a surgeon's glove.

It is also known to make seamless plastic gloves having textured surfaces in which textured surfaces is formed of granular material. The size of the particles are of a greater diameter than the desired average thickness of the finished glove. However, as stated before, pinholes have been found to form in the film and therefore are not suitable for surgeons' gloves, see U. S. Pat. No. 3,148,235.

Other plastic sheet material having textured surfaces are disclosed in U. S. Pat. No. 3,585,099. However, the disclosure relates to making the plastic sheet on a substantially flat horizontal surface in which the sheet is textured, for example, for use as automobile carpets. It is not concerned with relatively thin textured films. It is also known to provide plastic films with textured surfaces for floor tiles. See U. S. Pat. No. 3,152,002.

SUMMARY OF THE INVENTION

With the foregoing in mind, it is an object of the invention to provide an impermeable plastic film having a textured surface which is formed in situ and to the method for making the same. It is another object of the invention to provide a seamless plastic glove or similarly molded article in which it is not necessary to maintain stringent controls on the granular resin particle size with respect to the film thickness.

It is another object of the invention to provide a textured surface which is achieved without embossing or molding confinement or pressure and desired film thickness and degree of coarseness is achieved by proper selection of resin granule size.

Still another object of the invention is to provide a textured seamless glove which can be thereafter packaged, stored, shipped and when used, conveniently donned without the use of powder.

The invention generally contemplates providing a new and improved process of manufacture for making plastic articles which are textured in situ while the resin film is on the form and in an uncured, gelled state. The article is constituted by a shaped film made from liquid dispersions of vinyl chloride polymers in a suitable plasticizer. A film of the resin dispersion or plastisol is applied to a suitable form such as a hand. The film carried by the shaped form is subjected to a temperature of about 450°F. for a relatively short period of time to heat set the film on the form while maintaining the film in a gelled tacky state. Granular vinyl chloride particles are applied to the gelled form in a non-uniform random distribution. The gelled form is then subjected to a further heat curing step of at least 450°F. for a relatively short period of time but a greater length of time than the initial heat setting step, thereby fully fusing the resin and plasticizer and firmly bonding the vinyl chloride particles into the film. The resulting formed glove is found to be without pinholes has improved strength and the vinyl particles are firmly embedded in the film. The glove is removed from the form and is suitable for donning without the use of a lubricant such as powder.

DESCRIPTION OF THE PREFERRED EMBODIMENT

Figure 1:
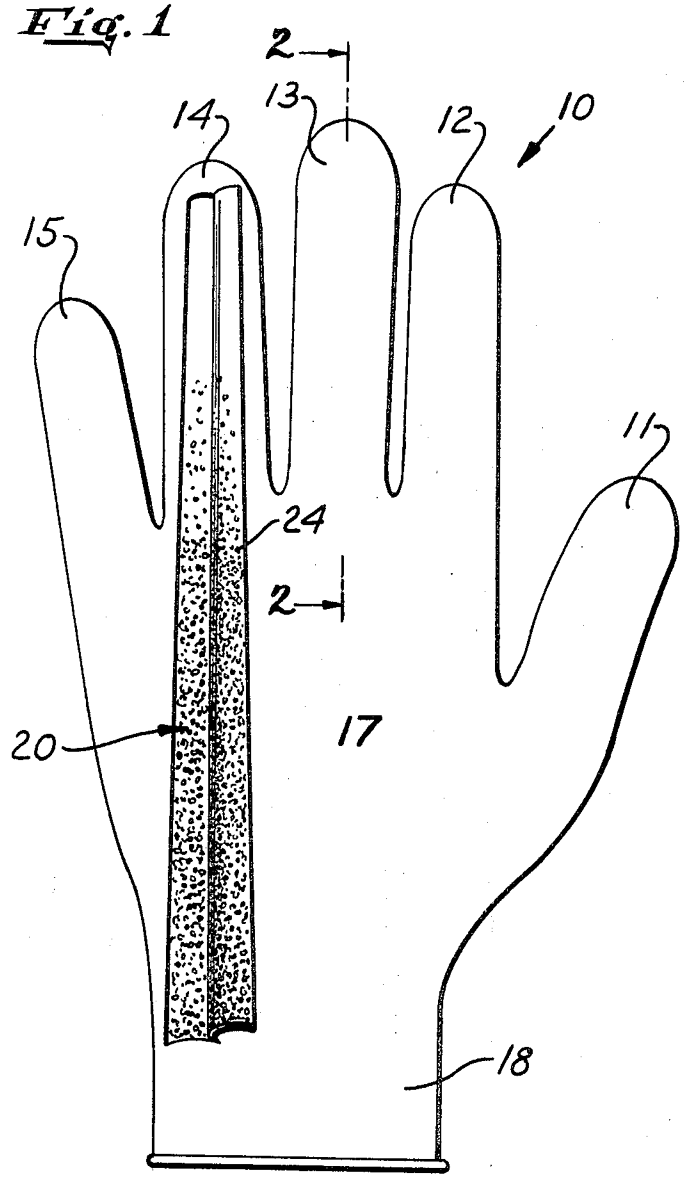
FIG. 1 is a plane view of an impermeable film in the form of a surgeon's glove in which a portion of the film is peeled away to illustrate the random distribution of particles bonded to the film which form the textured surface.

Referring now to FIG. 1, a polyvinyl chloride textured glove suitable for donning without the use of a lubricant such as powder is illustrated and is shown as a seamless five fingered surgeon's glove 10. The glove has five finger stalls, a thumb stall 11, an index finger stall 12, a middle finger stall 13, a ring finger stall 14 and a little finger stall 15, a palm portion 17 and a cuff portion 18. A longitudinal section is cut from the glove starting from the cuff portion through the ring finger portion 14 and is peeled away to illustrate the textured surface 20 in which a heavy concentration of granular particles 24 is randomly distributed over palm portion 17 while a thinning out of particles 24 is visibly noticeable and finger stall portions, thus illustrating a non-uniform pattern of random distribution of granular particles 24 on the inner surface of the plastic film of glove 10.

Figure 2:
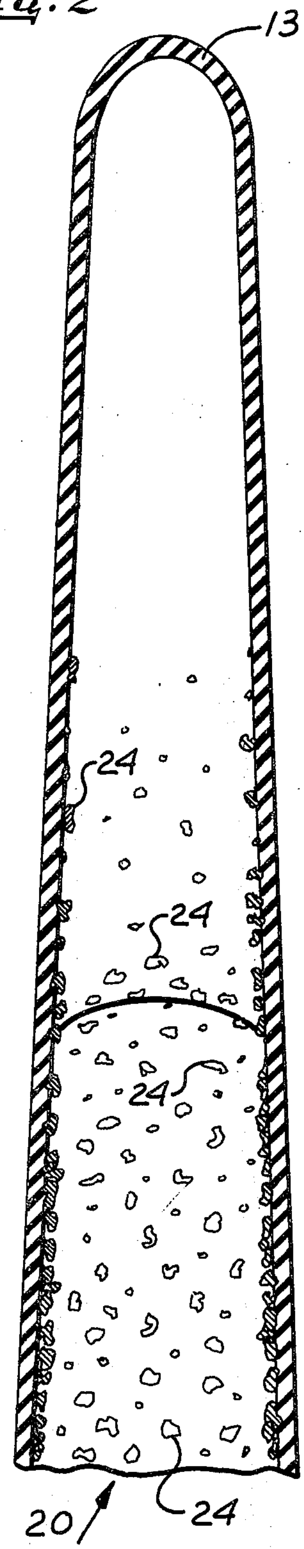
FIG. 2 is an enlarged, fragmentary, sectional view of a finger stall taken along the line 2—2 of FIG. 1.

In FIG. 2, middle finger stall 13 is greatly enlarged to particularly illustrate the non-uniform random distribution of particles 24 and the non-uniform particle size with respect to the film thickness of the film forming stall 13. The vinyl chloride resin particles 24 are shown randomly distributed within the finger stall 13 in a non-patternwise distribution and in which the particles of the vinyl chloride vary in size. Also, portions of the vinyl chloride particles are shown embedded and bonded in the film of finger stall 13 but do not penetrate therethrough thereby obviating any pinholes forming after the glove is cured.

Figure 3:
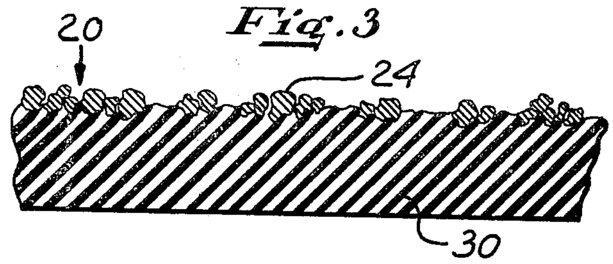
FIG. 3 is a greatly enlarged sectional view of a film illustrating the particles bonded in the film in a non-uniform, random distribution.

In FIG. 3 a section of impermeable polyvinyl chloride film is shown having a textured surface 20 in which granular particles of vinyl chloride 24 are embedded therein.

The invention herein may be practiced by dip or spray application of the liquid plastisol onto a shaped form, either directly, or onto an intermediate layer of woven or non-woven fabric if a fabric lining is desired in the finished product. after the plastisol has been applied to the form and the excess material drained therefrom, material is subjected to heating to set the film into a gelled state so that the layer or film of resin adhering to the form will remain tacky and will not be distorted by further gravitational flow along the form, i.e. to maintain substantially uniform film thickness over the form. Then, particles of a resinous material are applied to the form, for example, by passing the form through a spray chamber or by dusting techniques for dusting particles onto the gelled tacky film surface. The particles will adhere to the gelled tacky film and will become embedded therein. The remaining plasticizer in the gelled film will cause a solvation to take place between the resinous particle and the gelled film to form a weld or bond. Thereafter, the gelled form with the resinous particles embedded therein are subjected to a further heat curing step to permanently bond the particles in the film. Thereafter, the shaped article after cooling is removed from the form and is ready for packaging and for subsequent use.

The resinous material employed in the invention herein may be any suitable, conventional thermoplastic resin, and is preferably a vinyl resin, especially a vinyl chloride resin, as represented by vinyl chloride homopolymer or copolymers of vinyl chloride with such copolymerizable monomers as vinyl acetate and the like. Mixtures of resin for example polyvinyl chloride and vinyl chloride-vinyl acetate copolymer may be used to form a plastisol which is applied as a film to a forming surface such as a glove mold. The plastisol may be applied to the mold in any suitable, conventional manner, such as by spraying or dipping. The plastisol may contain compounding ingredients such as pigments, stabilizers, thickeners or thixotropic agents, etc. The resin of the base layer may be the same as that of the texturizing particles applied thereon, except that the particle size of the plastisol forming resins is generally considerably smaller than that which will provide a granular texture to a surface.

After the resin film is applied to a shaping form such as the glove mold, a measured amount of heat is applied to the mold so that the surface of the plastisol base layer is in a semi-wet, semi-gelled state when the resin particles are applied so that the lower portions of the resin particles become partially embedded in the plastisol layer or film, even without the use of thixotropic agents which are usually not compatible with the low viscosity of plastisols required for making thin-film flexible resinous articles. These particles remain protruding out of the plastisol layer to provide a desired rough texture, or a grain-like surface, which is a consequence of the size and shape of the protruding resin particles.

The resin particles which have been found useful for carrying out the invention herein are in a form commonly supplied by resin manufacturers. Examples of resin particles are VC 260 C sold by the Borden Company, Marvinol VR 10 sold by the Uniroyal Company, and Exon 666 sold by the Firestone Company, although many other resin particles which are available and are commonly referred to as blending or filler resins are quite suitable. It has also been found that extrusion grade resins may also be used.

In forming the film on the shaped form, it has been found that the average thickness of the film formed when a surgeon's glove is to be made ranges between about 2 to about 5 mils. As noted above, the particle size of the resin forming the plastisol is considerably smaller than the resin particles applied to the gelled surface of the shaped film. It is preferred, however, that the size of the resin particles average less than the average thickness of the film and generally not not exceed 5 mils and preferably between about 0.1 to 4 mils.

By employing the process of the invention herein, particularly in the manufacture of thin films suitable for use as surgeons' gloves, the film forming the glove is continuous and free of pinholes. However, when applying the resin particles to the plastisol according to the prior art and then curing the film with the resin particles uniformly distributed therein, the film contains microscopic discontinuities which are known as pinholes and thus cannot be used as surgeons' gloves due to sterility and contamination problems. This is particularly true when a film thickness lies within the critical range of between 2 to 5 mils. It has also been found when using the gloves made by the process of the invention herein that while the gloves may be donned without employing powder as a lubricant, there is no detrimental effect with respect to tactile sensitivity, frictional or grip characteristics over existing surgical gloves.

For a better understanding of the invention herein, the following example is included to illustrate the aspects of the invention.

EXAMPLE

The following is a formulation for the preparation of a vinyl plastisol for making a so-called featherweight surgical glove of about 9 inches in length and weighing about 5.8 grams with a finger-tip thickness of about 2½ mils, all parts by weight:

| | Parts by Weight |
|---|---|
| Polyvinylchloride powder (Geon 126 by B.F. Goodrich) | 100 |
| Dioctyl phthalate (primary plasticizer) | 65 |
| Dioctyl Azelate (primary plasticizer) | 25 |
| Diisodecyl phthalate (primary plasticizer) | 10 |
| Epoxidized Soybean Oil ("Flexol EIP" by Union Carbide — Stabilizer) | 3 |
| Organic zinc compound ("Nuostabe V-1260" by Nuodex Corporation — Stabilizer) | 3 |
| Phthalocyanine Green (30% active — pigment) | 0.2 |

In the above formulation for the vinyl plasticizer, the amounts of dioctyl phthalate, dicotyl azelate diisodecyl phthalate may vary plus or minus 8 PHR with only minor variation in the resulting properties of the cured film.

After high shear mixing of the above plastisol until a thorough dispersion is obtained, the viscosity of the mixture is about 200 centipoises. The plastisol is maintained at a temperature of about 100°F., the viscosity of which is about 160 centipoises. The shaped forms, for example, a thin-wall mold for a glove is preheated for about 2 minutes at a temperature of 235°F. Then the glove mold is dipped into a tank containing the prepared plastisol and then is removed and allowed to drain for about 2 minutes. The coated mold is then conducted to a heating zone in which it is subjected to a temperature of about 450°F. for about 5 seconds to set the film thereon and form a tacky gell-like material. The mold is then removed from the heating zone and placed in a resin particle application zone, for example, a spray booth, in which a spray of polyvinyl chloride resin VC 260 C is applied to the gelled surface formed on the glove mold so that a non-uniform random dispersion of particles become embedded in the gelled surface. The glove mold carrying the gelled film together with the resin particles of polyvinyl chloride is conducted to a second heating zone to cure the resin at a temperature of 450°F. for about 50 seconds. The cured resin film carried on the glove form is then removed from the heating zone and allowed to cool to room temperature which generally requires about 2 minutes. The cured glove is stripped from the form so that the textured surface becomes the inner surfaces of the glove as shown in FIG. 1 of the drawings.

The foregoing process obviates the necessity of maintaining constant stirring in the plastisol dipping tanks since the large polyvinyl chloride resin granules do not remain suspended in the plastisol. Thus, the plastisol of the invention herein is a stable dispersion and does not settle and further when forming the film on the glove mold an accurate controlled thickness can be maintained since resin granules are not mixed with the plastisol which varies the thickness of the film on the mold and causes pinholes due to uneven distribution of the polyvinyl chloride plastisol.

It is obvious that many plastisol formulations may be made within the skill of the art and other resin particles may be employed for preparing textured gloves or other textured resin particles according to the processes described above. However, it has been found that the particle size of the resin used for making the plastisol should be considerably smaller than the particle size of the resin granules used for forming the textured surface.

I claim:

1. A seamless disposable glove adapted to be donned without the use of powder, said glove comprising an impermeable relatively thin resin film having a textured surface, said film being formed from plasticized polyvinyl chloride and said film having applied thereto a non-uniform distribution of particles of granular vinyl chloride polymer having less than the average thickness of the film, said particles being at least partially embedded therein but not extending through the film thickness so as to provide a textured surface.

2. The seamless disposable glove of claim 1 wherein the textured surface is the inner surface of the glove.

3. The seamless disposable glove of claim 1 wherein the particles applied to the impermeable relatively thin resin film are predominantly concentrated around the palm and cuff portion of said glove and sparsely distributed around the finger stall zones of said glove.

4. The seamless disposable glove of claim 1 wherein said impermeable film thickness is from 2–5 mils.

5. The seamless disposable glove of claim 1 wherein the particle size of the granular vinyl chloride polymer is less than about 5 mils.

6. The seamless disposable glove of claim 1 wherein the particle size of granular vinyl chloride polymer is from about 0.1 to about 4 mils.

* * * * *